United States Patent [19]

Penasse et al.

[11] 3,872,085

[45] Mar. 18, 1975

[54] PREPARATION OF SALTS OF ALPHA-D GLUCOSE-PHOSPHORIC ACID

[75] Inventors: Lucien Penasse, Paris; Pierre Barthelemy, Clichy-sous-Bois, both of France

[73] Assignee: Roussel Uclaf, Paris, France

[22] Filed: Jan. 11, 1973

[21] Appl. No.: 322,847

[30] Foreign Application Priority Data
Jan. 19, 1972 France .............................. 72.01719

[52] U.S. Cl. ............................................ 260/234 R
[51] Int. Cl. ........................ C07c 69/32, C07d 51/50
[58] Field of Search ............ 260/234 R, 211.5, 987, 260/210.5, 234

[56] References Cited
UNITED STATES PATENTS
3,251,828   5/1966   Lutz ................................ 260/234 R
3,428,624   2/1969   Toy ................................. 260/234 R
3,498,969   3/1970   Lewis .............................. 260/211.5

FOREIGN PATENTS OR APPLICATIONS
11,653   1913   United Kingdom ............... 260/234 R Primary Examiner—Johnnie R. Brown
Assistant Examiner—Cary B. Owens
Attorney, Agent, or Firm—Hammond & Littell

[57]  ABSTRACT

Novel process for the preparation of alkali metal, alkaline earth metal and ammonium salts of α-D-glucose-1-phosphoric acid by reaction of phosphoric acid and pentaacetyl-β-D-glucose and to novel salts.

4 Claims, No Drawings

PREPARATION OF SALTS OF ALPHA-D GLUCOSE-PHOSPHORIC ACID

STATE OF THE ART

An article in Biochem. Prep. I (1949), p. 33 describes the preparation of potassium α-D-glucose-1-phosphate by reacting pentaacetyl-β-D-glucose with hydrobromic acid in the presence of acetic acid to form tetraacetyl-α-D-glucose-1-bromide which is then reacted with silver phosphate to form tetraacetyl-α-D-glucose-1-phosphate, deacetylating the latter by reaction with methanol and hydrochloric acid to form α-D-glucose-1-phosphoric acid, salifying the latter with barium hydroxide to form barium α-D-glucose-1-phosphate and subjecting the latter to double decomposition with potassium sulfate to obtain potassium α-D-glucose-1-phosphate. However, this process requires 5 successive steps and does not permit obtaining the α-D anomer of potassium glucose-1-phosphate without the β-D anomer.

Another method for the preparation of salts of glucose-1-phosphoric acid is effected by double decomposition of a mineral salt and a salt of glucose-1-phosphoric acid. French Pat. No. 1,453,215 describes double decomposition of a calcium salt such as calcium chloride and a salt of glucose-1-phosphoric acid but the α-D anomer of calcium glucose-1-phosphate obtained includes ammonium chloride which is difficult to separate as well as a little calcium β-D-glucose-1-phosphate.

OBJECTS OF THE INVENTION

It is an object of the invention to provide a novel simple process for the preparation of alkali metal, alkaline earth metal and ammonium salts of α-D-glucose-1-phosphoric acid in great purity.

It is another object of the invention to provide novel salts of α-D-glucose-1-phosphoric acid of good purity.

These and other objects and advantages of the invention will become obvious from the following detailed description.

THE INVENTION

The novel process of the invention for the preparation of a compound selected from the group consisting of alkali metal, alkaline earth metal and ammonium salts of α-D-glucose-1-phosphoric acid comprises reacting pentaacetyl β-D-glucose of the formula

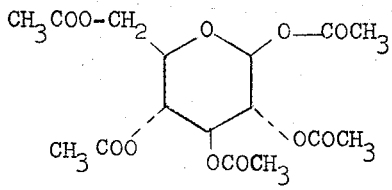

with phosphoric acid to obtain a product of the formula

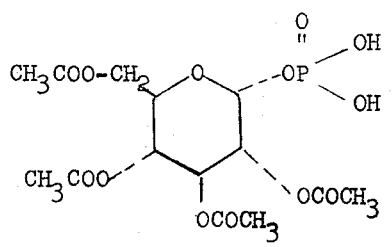

reacting the latter in methanol with ammonia to obtain an ammonium salt of the formula

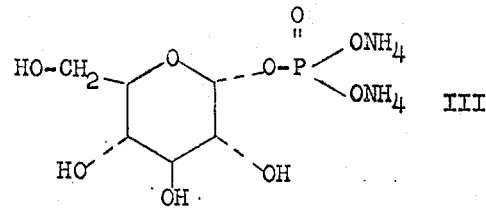

which can be reacted with an alkali metal or alkaline earth metal hydroxide to form the corresponding alkali metal or alkaline earth metal salt of α-D-glucose-1-phosphoric acid.

It is to be noted that calcium α-D-glucose-1-phosphate is useful for simultaneous administration of phosphorus and calcium to warm-blooded animals.

In a preferred mode of the process of the invention, pentaacetyl β-D-glucose is added to a phosphoric acid solution at 60°C and after holding this temperature for 1 hour, the mixture is cooled to 25°C and methanol is added. Ammonia is bubbled through the methanol solution until the pH is 5.5 to 6 and then the excess phosphoric acid which precipitates as monoammonium phosphate is removed by filtration and ammonia is bubbled through the methanol filtrate containing the compound of formula II partially salified with ammonia for 9 hours to obtain the ammonium salt of formula III.

If the alkaline earth metal salt such as calcium is desired, an excess of calcium hydroxide is mixed with the compound of formula III to obtain calcium α-D-glucose-1-phosphate of the formula

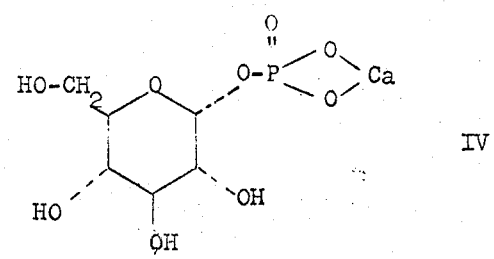

Other salts may also be prepared by reacting alkali metal hydroxides such as potassium or sodium hydroxide with the product of formula III.

The starting material, pentaacetyl β-D-glucose may be prepared by reacting α-D-glucose with acetic acid anhydride.

In the following examples there are described several preferred embodiments to illustrate the invention. However, it is to be understood that the invention is not intended to be limited to the specific embodiments.

EXAMPLE 1

Diammonium α-D-glucose-1-phosphate

Step A: Tetraacetyl D-glucose-1-phosphate 500 g of pentaacetyl-D-glucose including 405 g of pentaacetyl β-D-glucose were slowly added to a mixture of 940 g of phosphoric acid and 12.5 g of phosphoric acid anhydride heated to 60°C and after stirring the mixture at 60°C for 1 hour, the temperature was lowered to 25°C. 1,140 ml of methanol were added to the mixture and the methanolic solution was then diluted with 2,560 ml of methanol. Ammonia was passed therethrough until the pH reached equilibrium at a pH of 5.5 to 6. The monoammonium phosphate precipitate formed was removed by filtration and 5 g of activated carbon were added to the filtrate. After stirring for 15 minutes, the mixture was filtered and the recovered precipitate was washed with methanol to obtain 8,000 ml of a methanolic solution of tetraacetyl-D-glucose-1-phosphate.

Step B: Diammonium α-D-glucose-1-phosphate

Ammonia was bubbled through the 8000 ml solution from Step A for 9 hours and diammonium D-glucose-1-phosphate progressively crystallized. The crystals formed were recovered by filtration and were then washed three times with 250 ml of methanol and dried under reduced pressure to obtain 283 g of raw diammonium glucose-1-phosphate. The 283 g of raw product were added with stirring to 240 ml of distilled water and after heating the mixture to 50°C ± 1°C, then 2.4 ml of concentrated ammonium hydroxide and then 240 ml of methanol were added successively with stirring. The mixture was cooled to 20°C in 30 minutes and then was allowed to stand for 25 hours at room temperature. The precipitate recovered was washed with methanol to obtain 175 g (53.4 percent yield) of diammonium α-D-glucose-1-phosphate [taking solvation into account] having a specific rotation $[\alpha]_D^{20} = +98°$ ($c = 1$ percent in water).

EXAMPLE 2

Calcium α-D-glucose-1-phosphate 54 g of diammonium α-D-glucose-1-phosphate (comprising 50 g of dry diammonium α-D-glucose-1-phosphate) prepared as in Example 1 was added with stirring to 150 ml of dimineralized water and the resulting solution was heated to 30°C. 15.75 g of pure hydrated calcium hydroxide was added thereto and nitrogen was bubbled through the solution while stirring and at a vacuum of 20 mm Hg. The temperature of the reaction mixture was balanced at 24°C and demineralized water was progressively added to compensate for the lessening of the volume due to distillation. When the presence of ammonium hydroxide could not be detected in the media, it was cooled to 20°C and returned to normal pressure. 0.5 g of activated carbon were added thereto and the mixture was filtered to obtain a basic solution of calcium α-D-glucose-1-phosphate. The pH of the basic solution was adjusted to a pH of 6.9 by slow addition of Dowex 50 H⁺ resin (acid form) and the resin was removed by filtration. The resin was washed twice with 25 ml of demineralized water and the filtrate and aqueous wash waters were combined to obtain an aqueous solution of calcium α-D-glucose-1-phosphate. 1,250 ml of acetone were added over 20 minutes with stirring to the aqueous solution of calcium α-D-glucose-1-phosphate and the precipitate formed was recovered by filtration, was washed with 100 ml of a 1-5 water-acetone mixture and then twice with 100 ml of acetone and dried overnight under vacuum at 20°-25°C to obtain 55.23 g of calcium α-D-glucose-1-phosphate in the form of a white powder having a specific rotation $[\alpha]_D^{20} = +94°$ to $102°$ ($c = 1$ percent in water). This was a yield of 95.2 percent based on diammonium α-D-glucose-1-phosphate.

Various modifications of the products and process may be made without departing from the spirit or scope thereof and it is to be understood that the invention is to be limited only as defined in the appended claims.

We claim:

1. A process for the preparation of ammonium α-D-glucose-1-phosphate consisting essentially of reacting a compound of the formula

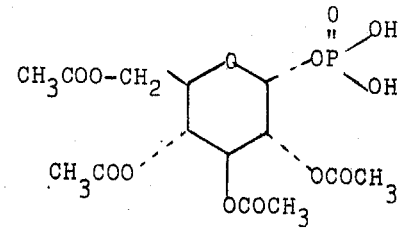

in methanol with ammonia to obtain the ammonium salt of α-D-glucose-1-phosphate of the formula

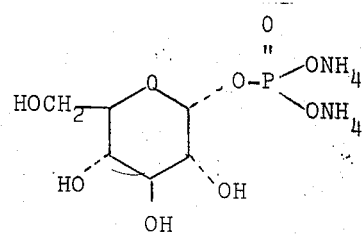

2. The process of claim 1 wherein the said ammonium salt is reacted with a member of the group consisting of alkali metal hydroxides and alkaline earth metal hydroxides to form the corresponding metal salt.

3. The process of claim 2 wherein the hydroxide is an excess of calcium hydroxide to form the corresponding calcium salt of the formula

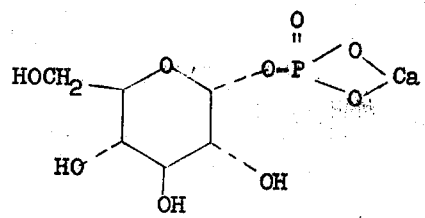

4. Diammonium α-D-glucose-1-phosphate having a specific rotation $[\alpha]_D^{20} = +98°$ ($c = 1$ percent in water).

* * * * *